United States Patent [19]

Wolcott et al.

[11] 4,384,632

[45] May 24, 1983

[54] CHARGING SYSTEM FOR SEISMIC GAS EXPLODER

[75] Inventors: Herbert A. Wolcott; J. Robert Fricke, both of Plano, Tex.

[73] Assignee: Atlantic Richfield Company, Los Angeles, Calif.

[21] Appl. No.: 222,809

[22] Filed: Jan. 5, 1981

[51] Int. Cl.³ .................... G01V 1/108; G01V 1/38
[52] U.S. Cl. ..................................... 181/118; 367/145
[58] Field of Search .................. 181/106, 110, 118; 367/145; 29/594; 166/249

[56] References Cited

U.S. PATENT DOCUMENTS

| | | | |
|---|---|---|---|
| 1,500,243 | 7/1924 | Hammond | 181/118 |
| 2,846,019 | 8/1958 | Long | 181/106 |
| 2,994,397 | 8/1961 | Huckaboy | 367/145 |
| 3,022,852 | 2/1962 | Paney | 181/118 |
| 3,048,816 | 8/1962 | Lubnow | 181/118 |
| 3,072,829 | 1/1963 | McDonal | 367/145 |
| 3,382,946 | 5/1968 | Smith et al. | 181/118 |
| 4,007,804 | 2/1977 | Hardison et al. | 181/110 |
| 4,016,952 | 4/1977 | Reed et al. | 367/145 |

FOREIGN PATENT DOCUMENTS

| | | | |
|---|---|---|---|
| 714320 | 2/1980 | U.S.S.R. | 367/145 |
| 723473 | 3/1980 | U.S.S.R. | 367/145 |

*Primary Examiner*—Nelson Moskowitz
*Attorney, Agent, or Firm*—Robert M. Betz

[57] ABSTRACT

Oxygen and propane are supplied to the combustion chamber of a marine seismic gas exploder from a pair of pressure regulated gas charging cylinders. Ignition of the resultant explosive gas mixture drives a piston connected with means for creating an acoustic disturbance in the water. The outputs from the charging cylinders are fed simultaneously to a mixing manifold connected to a large orifice communicating with the combustion chamber.

The ratio of gases in the resultant mixture is automatically determined by the relative volumes and pressures of the charging cylinders, which may be precisely regulated by adjustment of pistons movable within such cylinders and by gas pressure regulation. To safeguard against too rapid voiding of a small volume charging cylinder, voiding of the larger volume cylinder may be initiated first with the aid of a choke downstream of the manifold. This will create an artificial back pressure in the distribution system.

6 Claims, 2 Drawing Figures

CHARGING SYSTEM FOR SEISMIC GAS EXPLODER

BACKGROUND OF THE INVENTION

1. Field of the Invention

This invention relates generally to the field of seismic gas exploders and more particularly to an improved method and apparatus for charging such devices with an explosive mixture in the desired proportion.

2. Description of the Prior Art

There are innumerable uses for gases which are combined in various predetermined ratios, wherein the efficiency of such use is highly dependent upon the accuracy and repeatability with which such ratios can be established and maintained. One such use is the field of seismic gas exploders, particularly marine, for generation of acoustic pulses, wherein oxygen and a fuel gas, such as propane, are introduced into a combustion chamber through variable size orifices. In operation, ignition of the gas mixture propels a plate through the water to create an acoustic disturbance.

In this prior art system, relatively large volume gas bottles or containers are continuously interconnected with individual surge chambers which are regulated to a pressure well in excess of that in the mixture to be combusted. When a fill operation is undertaken, solenoid operated valves are opened between the surge chambers and the orifices after passing through check valves. The fill continues for a fixed period of time, the percentage of each gas in the resultant mixture being determined by the orifice parameters provided all gas pressures are fixed.

The difficulty with this arrangement is that the integrity of very smll orifices, for example, on the order of several 64ths of an inch, is hard to maintain. This is because of the presence of contaminants in the orifice such as carbon chips or oil and/or the existence of mechanical problems such as surface irregularities.

In the above device, the accuracy of filling operations depends upon so-called orifice equations, which take account of factors such as friction, gas compressibility, orifice size and shape, the presence of laminar or turbulent flow, and the like. These equations cannot predict the character of the resultant gas mixture with reliability. Yet, in field operations involving marine seismic gas exploders, mixture control is important in optimizing the time of occurrence and amplitude of the predominant peak of the acoustic wave resulting from a shot. With presently available methods, the gas mixtures introduced into a marine gun must be adjusted on an individual basis, (i.e., by varying the orifice fittings) which requires that the gun be removed from the water and put out of service. It would be more efficient and otherwise desirable to be able to adjust the gas mixtures of a series of deployed marine exploders as a group without interruption of operations or removal of the devices from the water.

A further problem with prior art mixing systems for such marine gas exploders is that gases introduced individually into a combustion chamber, even in the desired ratios, may not be homogeneously mixed within the chamber at the time of detonation, if such detonation is programmed to occur after a very short time delay.

It is, therefore, a general object of this invention to provide a method and apparatus for charging combustion gases into a seismic gas exploder in a desired ratio with a high degree of accuracy and repeatability.

It is a further object of this invention to provide a method and apparatus for charging the combustion chamber of a marine seismic gas exploder with two or more gases to a desired ratio wherein such ratio may be readily varied.

These and other objects and advantages of this invention will become apparent from a consideration of the detailed description and drawings to follow.

SUMMARY OF THE INVENTION

In accordance with the preferred embodiment of the method and apparatus of this invention, two or more supply vessels containing individual gases are connected respectively through solenoid valves with a like number of variable volume gas charging cylinders. The charging cylinders are in turn interconnected through downstream solenoid valves and check valves with a T-joint or manifold. All of this equipment may conveniently be carried aboard a marine tow vessel. The manifold is then connected, through flexible conduit, with relatively large size orifices opening individually into the respective combustion chambers of each of a plurality of marine gas exploders adapted to be deployed as a group from the tow vessel.

In operation, the individual gases are introduced into all of the charging cylinders at predetermined pressures, well in excess of that of the balance of the distribution system to be utilized. Thereafter the gases are admitted either simultaneously or sequentially into the manifold through which they pass in the form of a mixture into the exploder combustion chambers. The flow from each charging cylinder continues until the pressure in that cylinder is equalled or exceeded by the total gas pressure in the combustion chambers. In that manner, the gases will be fed as a mixture into the combustion chambers for any selected fill time and in proportion to the relative volumes of the charging cylinders. In an alternate embodiment of the method and apparatus of this invention, gas is supplied first from the largest volume charging cylinder and momentarily thereafter from the remaining charging cylinder. A choke or restriction is introduced in the line downstream of the manifold so that a back pressure is created in the manifold slightly less than the initial charging cylinders pressure. This prevents the smaller volume charging cylinder from dumping into the manifold prematurely and thus disrupting the mixing operation.

DESCRIPTION OF THE PREFERRED EMBODIMENT

Figure 1:
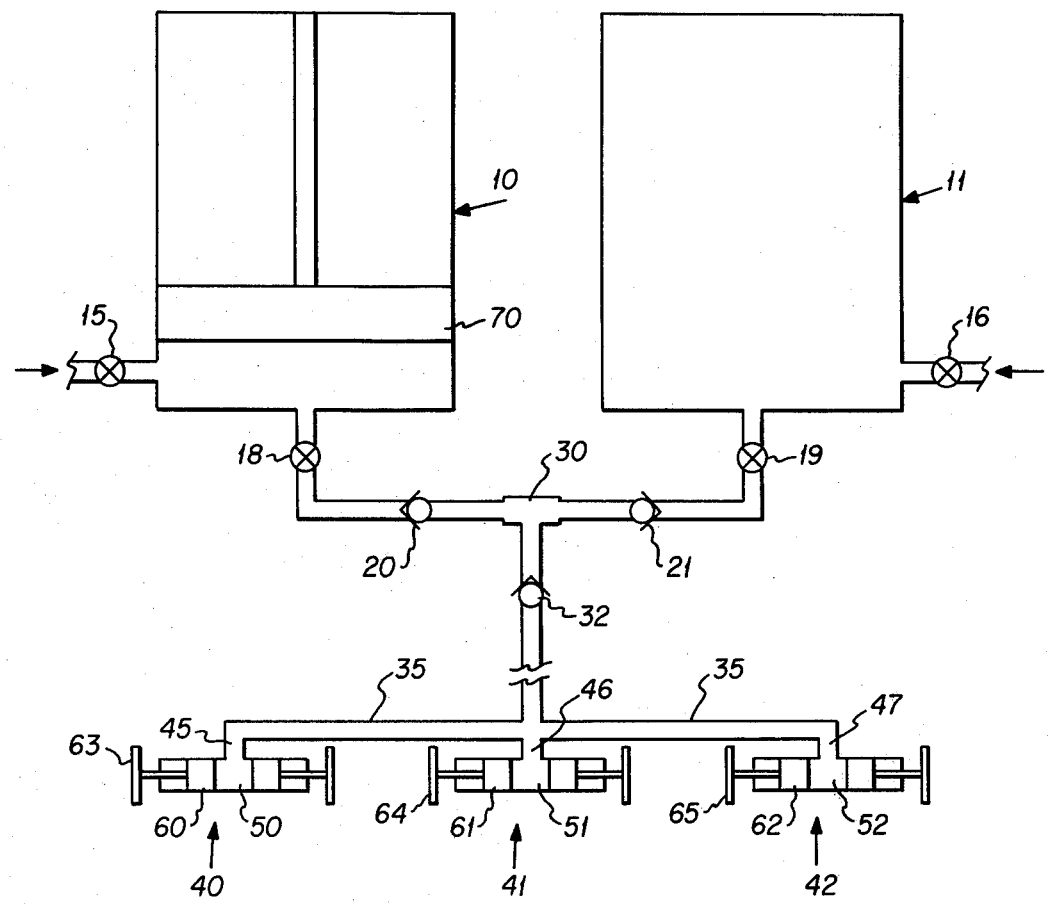
FIG. 1 is a block diagrammatic view of an apparatus in accordance with the preferred embodiment of this invention.

With reference not to FIG. 1, from a plurality of large volume individual gas supply vessels (not shown), charging cylinders 10 and 11 are filled through solenoid valves 15 and 16, to a predetermined pressure. The relative gas volumes and pressures of cylinders 10 and 11 determine the ratio in which the individual gases contained therein, such as fuel gas and oxygen, are to be present in any ultimate mixture.

The downstream side of cylinders 10 and 11 are provided respectively with additional solenoid valves 18 and 19 which are in turn connected through check valves 20 and 21 with manifold 30. Manifold 30 is connected through check valve 32 to flexible conduit 35 interconnected in the water with deployed marine gas exploders 40, 41 and 42. This connection is made through relatively large size orifices 45, 46 and 47 leading into combustion chambers 50, 51 and 52.

The pressures in charging cylinders 10 and 11 are maintained at values substantially higher than that to be given the ultimate mixture in chambers 50-52. It is also assumed that initially, manifold 30 and combustion chambers 50-52 are at atmospheric pressure.

In operation, solenoid valves 18 and 19 are opened either simulaneously or sequentially, so that the individual gases are able to dump rapidly into manifold 30 through check valves 20 and 21, whose chief function is to prevent cross contamination between the charging cylinders which would create a severe explosion hazard. The gases continue, after mixture in manifold 30, through check valve 32 along conduit 35 and into combustion chambers 50-52 through orifices 45-47. Exploders 40-42 may be fired by sparking the mixtures in chambers 50-52 in a well-known manner. This causes pairs of pistons 60, 61 and 62 to be driven oppositely to propell corresponding pairs of plates 63, 64 and 65 through the water thereby generating acoustic pulses by implosion. So long as the falling pressure in either of cylinders 10 and 11 remains above the rising pressure in manifold 30, the intermediate check valve for that charging cylinder will remain cracked open and a flow from such charging vessel will continue. The percentage of voidage of each charging cylinder 10 or 11 in any given time period is constant and thus the manifold 30 continuously mixes and passes the two gases to the combustion chambers 50, 51 and 52 in the proper ratio. This occurs because the flow from each charging cylinder is just fast enough to keep its associated check valve from closing.

From aboard the tow vessel the signal output of exploders 40-42 may be monitored. If, based upon the time of occurrence and amplitude of the predominant peak signal, it is believed that the mixture of oxygen and propane is improper the ratio of gases can be readily changed, for example, by moving the position of piston 70 upwardly or downwardly within cylinder 10 or by changing the cylinder charge pressure. This completely avoids the necessity of removing any of exploders 40-42 from the water or adjusting any orifice fittings. Since the individual gases are mixed in manifold 30 before entry into exploders 40-42 the likelihood of detonation failures through improper mixing is also avoided. Furthermore, since the gases enter combustion chambers 50-52 in a mixed state under a fairly high pressure head, the mixture can be sparked while these gases are in a turbulent state which makes the combustion more uniform. In an alternate embodiment of this invention (not shown) separate mixing manifolds are provided for each of a plurality of exploders. This avoids the possibility of accidental ignition of mixed gases along underwater conduits.

Figure 2:
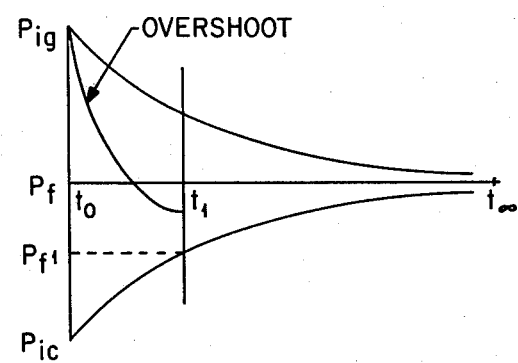
FIG. 2 is a graph which plots system gas pressure against time.

The digram of FIG. 2 illustrates the various pressures in a system such as described above, wherein $P_{ig}$ = initial charge cylinder gas pressure, $P_{ic}$ = initial combustion chamber pressure, $P_f$ = final equilibrium pressure for the system and $P_f$ prime = combustion chamber pressure at some finite time $t_1$. For simplicity, FIG. 2 assumes that all charge cylinders are initially at the same pressure. A similar diagram may readily be constructed to account for different charge cylinder pressures.

It is assumed at the beginning of a fill operation that the entire distribution system including the manifold 30 and the combustion chambers 50-52 is at atmospheric pressure. It is also assumed that the charging cylinders are pressured to a value $P_{ig}$ considerably above atmospheric pressure. When a fill operation begins, the values of $P_{ig}$ and $P_{ic}$ converge asymptotically toward the equilibrium pressure $P_f$ over theoretically time. Obviously, in a practical situation with a fill time of a few seconds, the acutal combustion chamber pressure $P_f$ prime will not have had time to reach at the true equilibrium pressure $P_f$.

If the volume of one of the two charging vessels such as cylinder 10 is relatively small in relation to the volumes of the combustion chambers and if in addition the value of $P_{ig}$ is not large the possibility exists that the small volume cylinder 10 will dump too quickly and consequently upset the correct mixture ratio. This is illustrated by the "over shoot" curve in FIG. 2. To avoid this possibility it is convenient to introduce a choke or flow restriction (not shown) at some point downstream of manifold 30. If then the gas in cylinder 11 is dumped into the manifold 30 a fraction of a second prior to the dumping of cylinder 10 the flow restriction can be effective to create a back pressure slightly less than the value $P_{ig}$ which will prevent overly rapid dumping of a very small volume charge cylinder, such as cylinder 10.

We claim:

1. In a system for charging the combustion chamber of a marine seismic gas exploder with an explosive gas mixture wherein such exploder is of the type including a cylindrical body in which a piston is driven by the expansion of a combustible gas mixture to produce an acoustic disturbance in water, the improvement comprising two or more charging cylinders containing preselected volumes of individual gases to be supplied to said combustion chamber, means for filling said charging cylinders to predetermined initial pressures, a mixing manifold, means for introducing gas from said charging cylinders into said manifold, and means for supplying mixed gases from said manifold to said combustion chamber, the flow of gas between any one of said charging cylinders and said manifold being adaptd to continue until the pressure in said manifold equals or exceeds that in said one charging cylinder, whereby the ratio of mixed gases in said combustion chamber is determined by the relative volumes and initial pressures of gases in said charging cylinders.

2. A system as in claim 1 wherein the initial gas pressure of said charging cylinders is equal.

3. A system as in claim 1 wherein gases from said charging cylinders are introduced simultaneously into said manifold.

4. A system as in claim 1 wherein said two or more gases are oxygen and propane.

5. A system as in claim 1 wherein the volume of either of said charging cylinders is variable.

6. A system as in claim 1 wherein the volume of either of said charging cylinders is varied by means of a movable piston.

* * * * *

UNITED STATES PATENT OFFICE
CERTIFICATE OF CORRECTION

PATENT NO. : 4,384,632
DATED : May 24, 1983
INVENTOR(S) : Herbert A. Wolcott; J. Robert Fricke It is certified that error appears in the above-identified patent and that said Letters Patent are hereby corrected as shown below:

Column 1, line 17, after "is", insert --in--.

Column 1, line 36, "smll" should read --small--.

Column 2, line 61, "not" should read --now--.

Column 3, line 16, "simulaneously" should read --simultaneously--.

Column 4, line 13, after "theoretically", insert --infinite--.

Column 4, line 15, "acutal" should read --actual--.

Column 4, line 49, "adaptd" should read --adapted--.

Signed and Sealed this

Twenty-third Day of August 1983

[SEAL]

Attest:

GERALD J. MOSSINGHOFF

Attesting Officer

Commissioner of Patents and Trademarks